US007421212B2

(12) United States Patent
Allen (10) Patent No.: US 7,421,212 B2
(45) Date of Patent: *Sep. 2, 2008

(54) DETECTING AND LOCATING PULSES USING A BRAGG CELL

(75) Inventor: John B. Allen, Lucas, TX (US)

(73) Assignee: Raytheon Company, Waltham, MA (US)

( * ) Notice: Subject to any disclaimer, the term of this patent is extended or adjusted under 35 U.S.C. 154(b) by 581 days.

This patent is subject to a terminal disclaimer.

(21) Appl. No.: 10/994,589

(22) Filed: Nov. 19, 2004

(65) Prior Publication Data

US 2006/0110166 A1 May 25, 2006

(51) Int. Cl.
*H04B 10/06* (2006.01)
(52) U.S. Cl. .................. 398/202; 398/204; 398/212; 398/208; 398/209; 398/210; 398/211; 398/183; 398/115; 398/116; 398/118; 398/135; 398/154; 398/155; 398/128; 398/130; 342/192; 342/387; 342/424; 342/442; 342/465; 356/256; 356/345; 356/346; 356/450; 359/305; 359/311; 359/310; 359/312; 359/313; 375/316; 375/130; 375/140; 324/76.36; 324/76.37; 324/76.19; 324/96; 324/160

(58) Field of Classification Search ............. 398/115, 398/183, 116, 75, 118, 202, 141, 79, 122, 398/204, 123, 207, 129, 212, 131, 213, 140, 398/214, 208, 209, 296, 210, 211, 189, 190, 398/191, 128, 130, 135, 136, 137, 154, 155; 356/256, 345, 346, 450; 324/160, 76.19, 324/76.36, 76.37, 96, 750; 359/305, 311, 359/310, 312, 313; 342/192, 387, 424, 442, 342/465; 375/316, 130, 140
See application file for complete search history.

(56) References Cited

U.S. PATENT DOCUMENTS

| 5,267,188 | A | * | 11/1993 | Pape et al. | .............. | 708/821 |
| 6,137,612 | A | * | 10/2000 | Startup | .............. | 398/199 |
| 6,466,159 | B1 | * | 10/2002 | Rotgans | .............. | 342/160 |
| 6,686,997 | B1 | | 2/2004 | Allen | .............. | 356/256 |

OTHER PUBLICATIONS

M. King, et al., "Real-Time Electrooptical Signal Processors with Coherent Detection," XP-002367845, Applied Optics, vol. 6, No. 8, pp. 1367-1376, Aug. 1967.
A. Vander Lugt, "Interferometric spectrum analyzer," XP-002367846, Applied Optics, vol. 20, No. 16, pp. 2770-2779, Aug. 15, 1981.
PCT, Notification of Transmittal of the International Search Report and the Written Opinion of the International Searching Authority, or the Declaration, PCT/US2005/040056, 13 pages, mailed Feb. 28, 2006.
Tsai, Chen S., "*Integrated Acoustooptic and Magnetooptic Devices for Optical Information Processing*", Proceedings of the IEEE, vol. 84, No. 6, Jun. 1996, pp. 853-869.

* cited by examiner

*Primary Examiner*—Hanh Phan
(74) *Attorney, Agent, or Firm*—Baker Botts L.L.P.

(57) ABSTRACT

Detecting a pulse of a signal includes receiving the signal and a light beam. The signal drives a spatial light modulator to modulate the light beam, where the complex amplitude of the modulated light beam is proportional to the signal current. The modulated light beam passes through an optical system and is detected by an optical detector array. A processor identifies a portion of the signal comprising the pulse.

17 Claims, 3 Drawing Sheets

DETECTING AND LOCATING PULSES USING A BRAGG CELL

TECHNICAL FIELD

This invention relates generally to the field of pulse processing and more specifically to detecting the presence of a pulse in a signal.

BACKGROUND

Signals are used in many applications such as in communication systems and radar systems. In certain applications, the signals may include pulses with durations as short as a few nanoseconds to as long as several hundred microseconds. The pulses may have a wide variety of modulations such as amplitude or phase modulation.

Pulse processors include a pulse detector and a pulse characterizer. The pulse detector detects the presence of a pulse in the signal and estimates both the time interval and the frequency interval in which the pulse resides. Once a pulse is detected, the signal along with the time interval and the frequency interval of the pulse is passed to the pulse characterizer. The pulse characterizer "snatches" the pulse from its time interval and frequency interval. The pulse characterizer then measures pulse characteristics such as the duration, amplitude, and modulation type.

The pulse detector typically searches over very wide frequency bands and long time records for pulses of a wide variety of modulations under high noise conditions. Due to the wide bandwidths and long time records that are searched, the pulse detector generally dominates the computational load of the pulse processor.

Known pulse processors include high-speed digital processors such as super computers. These pulse processors, however, are typically large and expensive. Other known pulse processors include customized digital processors such as field programmable gate array (FPGA) processors. These pulse processors, however, typically require relatively large amounts of power, especially for the analog-to-digital (A/D) converters required to digitize the incoming signal.

SUMMARY OF THE DISCLOSURE

In accordance with the present invention, disadvantages and problems associated with previous techniques for pulse detection may be reduced or eliminated.

According to one embodiment of the present invention, detecting a pulse in a signal includes receiving the signal and a light beam. The received signal drives a spatial light modulator to modulate the light beam, where the complex amplitude of the modulated light beam is proportional to the signal current. The modulated light beam is focused by a lens onto an array of optical detectors that detect the focused light beam. A processor receives the output current from the optical detectors and determines from the current the time interval and the frequency interval of any pulse that is in the received signal.

Certain embodiments of the invention may provide one or more technical advantages. A technical advantage of one embodiment may be a larger dynamic range at the cost of more stringent requirements upon the pulse detector components. Detecting and locating pulses in this manner may allow for processing of extremely wide bandwidth signals that include multiple pulses per second, while making efficient use of size, weight, and power.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
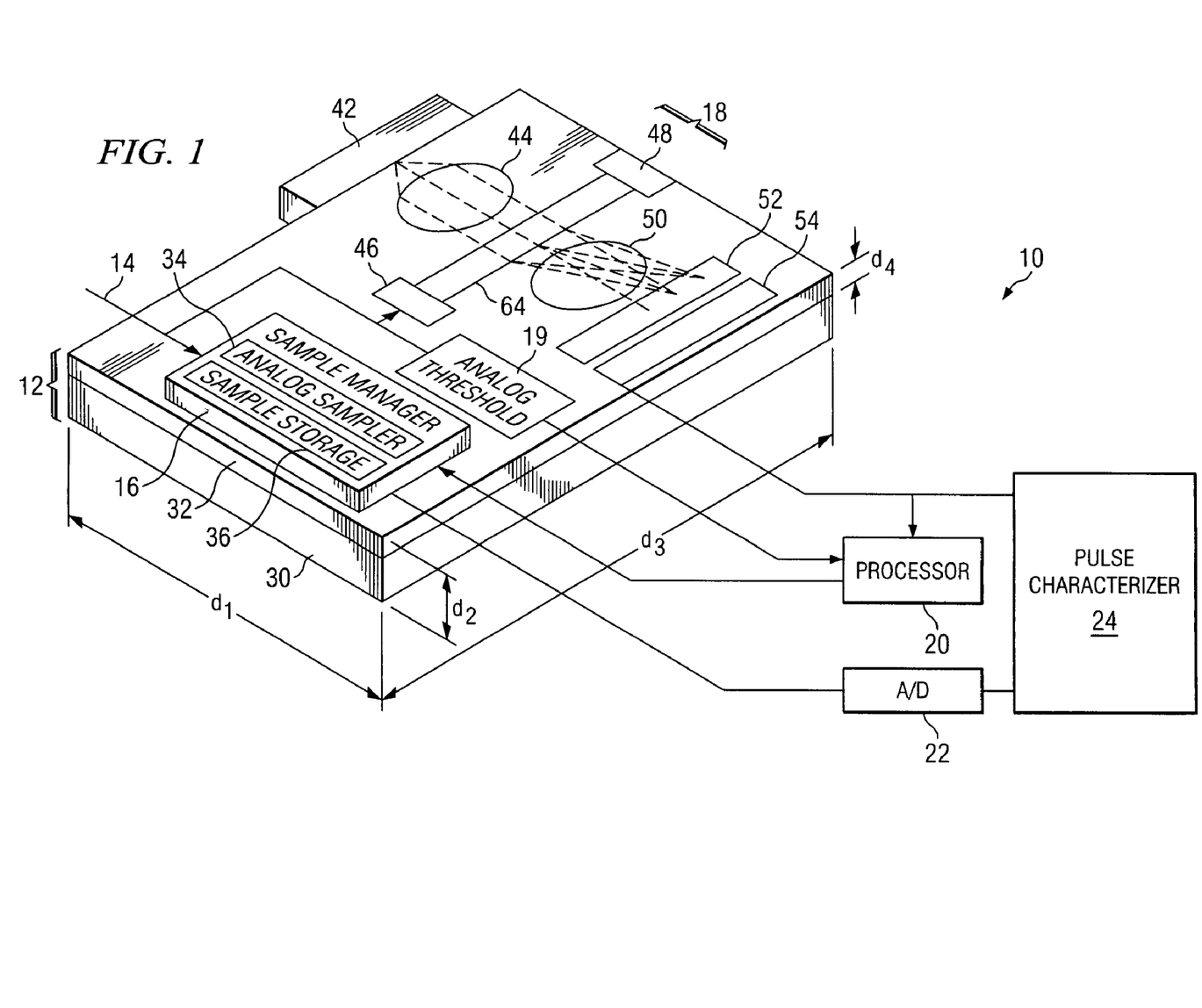
FIG. 1 is a diagram illustrating one embodiment of a system for incoherent optical detection of a pulse in a signal.
Figure 2:
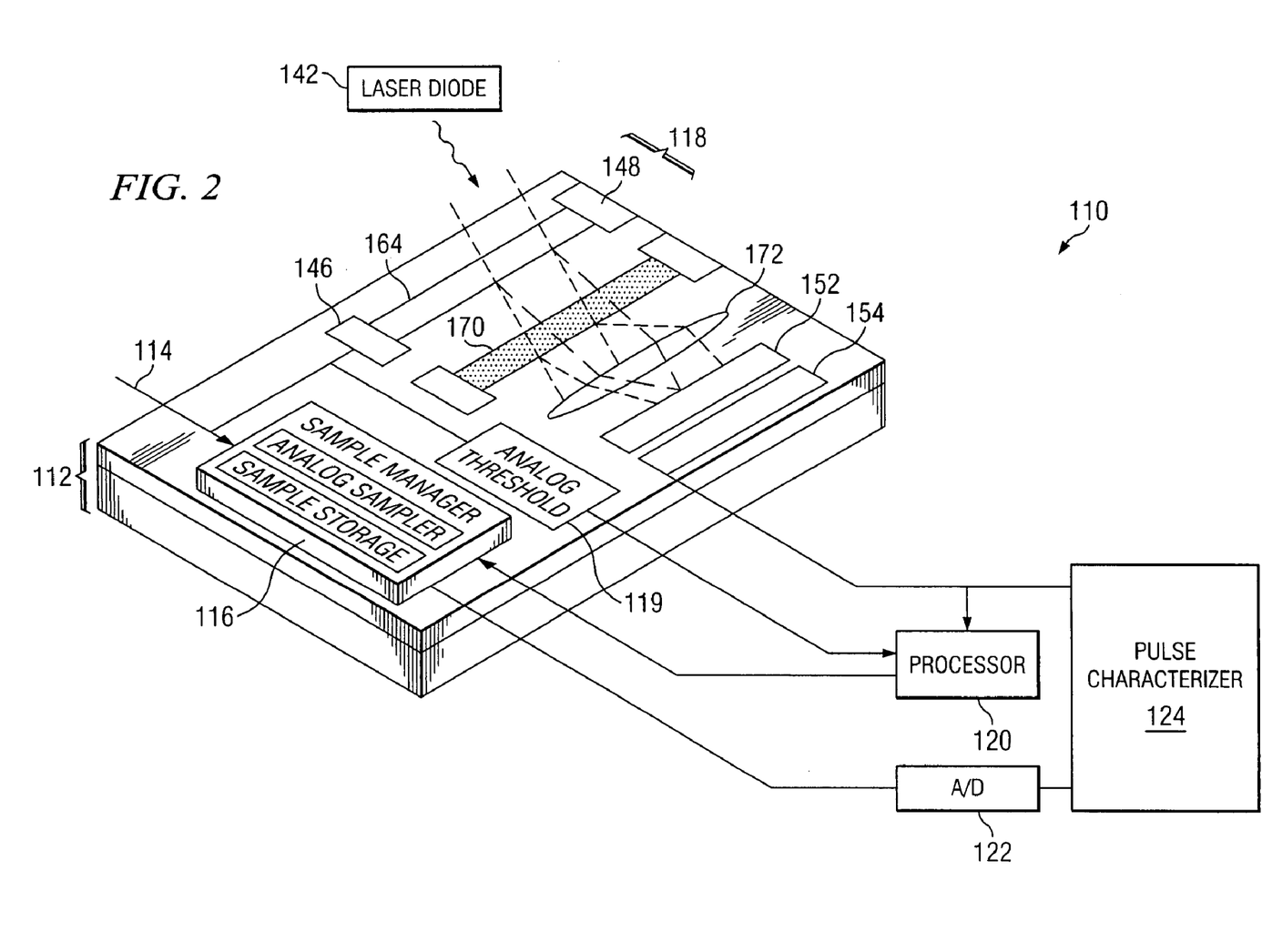
FIG. 2 is a diagram illustrating one embodiment of a system for coherent optical detection of a pulse of a signal.
Figure 3:
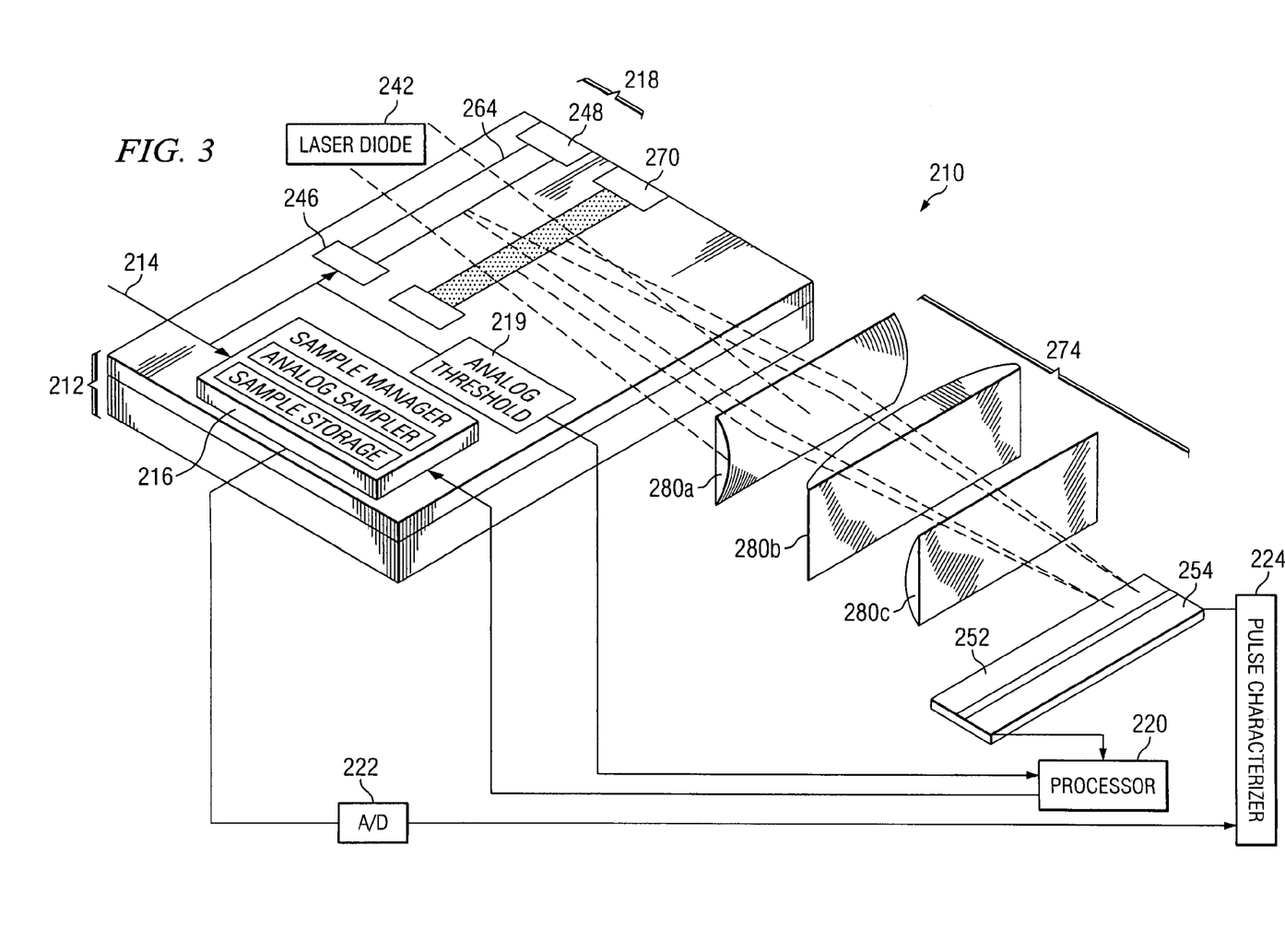
FIG. 3 is a diagram illustrating another embodiment of a system for coherent optical detection of a pulse of a signal in which some of the optics are external to the optical waveguide.

Embodiments of the present invention and its advantages are best understood by referring to FIGS. 1 through 3 of the drawings, like numerals being used for like and corresponding parts of the various drawings.

FIG. 1 is a diagram illustrating one embodiment of system 10 that uses incoherent optical detection to detect a pulse that may be included in a signal. System 10 includes an optical waveguide 12, an input signal 14, a sample manager 16, a guided wave Bragg cell 18, an analog threshold 19, and a processor 20 coupled as shown. System 10 is coupled to an analog to digital (A/D) converter 22 and a pulse characterizer 24 as shown.

In general, system 10 spatially modulates a coherent light beam with a spatial light modulator. A spatial light modulator (SLM) may refer to a device that modulates the complex amplitude of a coherent light beam as a function of displacement along the spatial dimension of the beam. An example of a spatial light modulator is a guided wave Bragg cell spatial light modulator (SLM) implemented by a surface acoustic wave (SAW) device that utilizes the Bragg diffraction of guided optical waves injected into the optical waveguide by a laser. An optical waveguide may be a very small device, which may reduce the volume of the processor.

The guided wave Bragg cell modulates a laser beam. A waveguide lens transforms or focuses the modulated beam, onto an array of optical detectors, placed in the focal plane of the lens, that detect the transformed light. The complex amplitude of light distribution as a function of displacement in the focal plane of a lens is, under certain conditions, the Fourier transform of the complex amplitude of the light leaving the spatial light modulator.

A focal plane processor takes the outputs of the optical detectors and processes them to obtain the time and frequency intervals of the detected pulses. These computations may be performed without digitizing the received signal, which may eliminate the need for A/D converters, thus reducing electrical power usage. Guided wave Bragg diffraction from SAW devices is known in the art, as described in "Integrated Acoustooptic and Magnetooptic Devices for Optical Information Processing," by Dr. Chen Tsai, *Proceedings of the IEEE* (June 1996).

According to one embodiment, system 10 utilizes incoherent optical detection, also known as direct detection, to detect a pulse in a signal and to determine the time and frequency intervals that locate the pulse. The signal drives a spatial light modulator (SLM) to spatially modulate a coherent light beam, so that complex amplitude of the modulated light beam is proportional to the current of the input signal. A signal may be represented by its current or voltage. For purposes of description, the signal is represented here by its current. A guided wave Bragg cell may be used as a spatial light modulator. The guided wave Bragg cell may be implemented as a surface acoustic wave device (SAW) in an optical waveguide. The SAW transducer receives the input signal and spatially modulates the refractive index along the SAW device that spatially modulates the light passing through the device by the Bragg effect.

A waveguide lens collimates the light from a diode laser and directs the light to the guided wave Bragg cell. A second waveguide lens, disposed after the guided wave Bragg cell, focuses the modulated light from the guided wave Bragg cell onto a detector array that is comprised of individual optical detector elements that are contiguous and lie in a straight line. The light falling on the detectors in the array has a complex amplitude that may be the Fourier transform of the input signal current. The output current of the optical detectors is proportional to the intensity of the Fourier transform of the input signal. The output of the optical detector goes to an electrical analog processor, such as a focal plane processor, that detects any pulses that may be present in the input signal and locates the time interval and the frequency interval where the pulses reside. The embodiment may yield a relatively fast, low power, small processor.

According to one example of operation, an input signal enters through input 14 and travels to guided wave Bragg cell 18 and to sample manager 16. Sample manager 16 takes analog samples of the input signal. A laser 42 generates a beam of coherent light that is injected into waveguide 12. Waveguide lens 44 may comprise a two-dimensional lens in waveguide 12 that collimates and directs the light beam to guided wave Bragg cell 18. Guided wave Bragg cell 18 spatially modulates the light beam to yield a modulated light beam. The modulated light beam may have a complex amplitude, as a function of displacement along the output plane of guided wave Bragg cell 18, that is proportional to the current of the input signal. This proportionality relationship may hold if the input signal is sufficiently small.

Waveguide lens 50 receives the light from guided wave Bragg cell 18 and transforms the received light beam into a light beam in the plane in front of a detector array. The light beam in front of the detector array has a complex amplitude as function of displacement along the detector array that is the Fourier transform of the input signal. Focal plane processor 54 takes the current generated from the optical detectors in the detector array and determines time and frequency intervals of the pulses of the input signal according to the focused light beam illuminating the detector array.

Processor 20 instructs sample manager 16 to send signal samples corresponding to the time intervals of the pulses to A/D converter 22 to be digitized and then to pulse characterizer 24. According to one embodiment, only the portion of the signal that includes a pulse, not 15 the entire signal, is digitized. Digitizing only the portion of the signal that includes the pulse may reduce the speed and total power requirements of A/D converter 22, which may reduce the power acquired for the entire device.

According to the illustrated embodiment, waveguide 12 operates to transform a light beam, injected into it by diode laser 42, to a substantially two-dimensional light beam. Waveguide 12 may comprise any suitable material operable to perform such transformation. According to the illustrated embodiment, waveguide 12 may comprise a substrate region 30 with a diffused region 32. Substrate region 30 may comprise any suitable material, for example, lithium niobate ($LiNbO_3$) or Indium gallium arsenide phosphide (InGaAsPh). Region 32 confines the light beam to effectively yield a two-dimensional light beam. Region 32 may be fabricated by Titanium-indiffusion (TI), by proton-exchange (PE), or by any other suitable fabrication technique.

Waveguide 12 may have any suitable dimensions. For example, waveguide 12 may have a dimension $d_3$ of approximately 6-10 millimeters such as 8 millimeters, a dimension $d_2$ of approximately 1 millimeter, and a dimension $d_1$ of approximately 15-20 millimeters such as 16 millimeters. Diffused region 32 may have a thickness of approximately 2-4 microns such as approximately 3 microns.

An input signal including pulses enters waveguide at input 14. The signal may have a bandwidth that may range from, for example, from 50 to 500 megahertz. A pulse may have characteristics such as duration, amplitude, and modulation type. Pulse duration may range from a few nanoseconds or less to several milliseconds or more. Pulse amplitude may range from 20 to 30 db below the noise level to 20 or 30 db or more above the noise level. Pulse modulation may refer to chirped, phase shift keying, frequency shift keying, or other type of modulation.

Sample manager 16 samples the input signal current to yield signal samples, stores the signal samples, and retrieves the signal samples based on sample identifiers. A sample identifier may comprise, for example, a time interval, a frequency interval, other identifier, or any combination of the preceding that may be used to identify a signal sample. For example, sample manager 16 may retrieve a signal sample based on the time interval corresponding to the signal sample. Sample manager 16 includes an analog sampler 34 and a sample storage 36. Analog sampler 34 samples the input signal, and sample storage 36 stores the signal samples. Sample storage 36 may include capacitive storage elements. Each storage element stores a charge or voltage with a magnitude that is proportional to the magnitude of a sample of the input signal current.

According to one embodiment, sample manager 16 may take samples at a rate consistent with the Nyquist rate. The storage may be randomly addressable such that a sample stored in a given storage element, such as a capacitor, may be obtained by sending a command to sample manager 16 to output the given sample. If a specific sample does not represent a portion of the signal that includes a pulse, a command may be sent to sample manager 16 to dump the charge corresponding to the sample into the substrate or to dispose of the sample by some other suitable means in order to clear sample manager 16 for storage of a new sample. The number of samples that represent detected pulses governs the rate at which the samples are read out of the sample storage. The read out rate may be substantially less than or equal to the input rate.

Guided wave Bragg cell 18 comprises a surface acoustic wave (SAW) device that may include a transducer 46, an acoustic absorber 48, and a medium 64 between 46 and 48 to conduct the surface acoustic wave. In general, diode laser 42 emits a beam of coherent light that is injected into waveguide 12, and waveguide lens 44 collimates that beam and directs the beam towards guided wave Bragg cell 18. The input signal drives transducer 46 to generate acoustic waves that pass through medium 64 to modulate the light beam. The complex amplitude of the modulated light beam as a function of displacement along guided wave Bragg cell 46 is proportional to the current of the signal.

Waveguide lens 50 directs the modulated light beam to detector array 52 and focuses the beam in the plane in front of array 52 so that the complex amplitude of the light in front of the array is the Fourier transform of the input signal. Detector array 52 detects the light beam. Focal plane processor 54 receives a current from the detector elements of array 52 and processes the current to detect any pulses in the signal and to locate the time and frequency intervals of the detected pulses.

According to the illustrated embodiment, diode laser 42 emits a coherent light beam such as a laser beam. Diode laser 42 may comprise a gallium-arsenide semiconductor laser diode that emits coherent light when a current is applied to its terminals. Waveguide lens 44 collimates the light beam and directs the light beam in a substantially parallel fashion towards guided wave Bragg cell 18.

The input signal may be up- or down-converted in frequency to match the center frequency of transducer 46. The input signal drives transducer 46 to modulate the refractive index of the Bragg cell medium 64 in proportion to the input signal. Bragg cell medium 64 modulates the light beam in response to the input signal current. The complex amplitude of the modulated light beam is proportional to the current of the input signal. Transducer 46 may comprise an interdigital transducer (IDT) that drives the surface acoustic wave device. An acoustic absorber 48 may be used to substantially contain or prevent the compression waves from traveling elsewhere in the waveguide.

Waveguide lens 50 transforms, or focuses, the light leaving guided wave Bragg cell 18 onto the detector array 52. The complex amplitude of the light in the plane of array 52 is the Fourier transform of the current of the input signal. The optical detectors of detector array 52 generate a detector output such as a low pass signal in response to the light beam and sends the detector output to focal plane processor 54. Detector array 52 can include an array of 1,000 or more detectors, where each detector may be approximately 25 microns square. The detectors are contiguous to each other and placed in a straight line. The number of detectors $N_d$ may be selected according to the frequency resolution $\Delta f$ and bandwidth BW of focal plane processor 54 as given by the expression:

$$N_d = \frac{BW}{\Delta f}$$

For example, if frequency resolution $\Delta f=0.5$ MHz and bandwidth BW=512 MHz, then number of detectors $N_d=1024$.

Focal plane processor 54 processes the optical detector output from detector array 52 to yield the time interval, the frequency interval, or both the time and frequency intervals of each of the pulses in the input signal. Focal plane processor 54 sends the time intervals and the frequency intervals of the detected pulses to processor 20 and pulse characterizer 24.

Focal plane processor 54 may comprise an electrical analog processor that performs mathematical operations on the detector output, and may use any suitable method for determining the time and the frequency intervals. For example, focal plane processor 54 may use a matched detection matrix (MDM) technique. The MDM technique searches for concentrations of energy in time and frequency interval pairs. An interval $\Delta t$ in the time domain and a corresponding interval $\Delta f$ in the frequency domain that has an energy concentration may indicate the presence of a pulse in the interval pair ($\Delta t$, $\Delta f$) of the received signal.

Detector output may be integrated over a wide variety of pass bands $\Delta f_i$ by filtering the output with a rectangular transfer function. The output may then be squared to obtain a power estimate and finally integrated over a variety of time windows $\Delta t_i$, where i=1, ..., N. The time intervals and the corresponding frequency intervals that have the highest normalized signal-to-noise ratios (SNR) are most likely to include an incoming pulse. A higher resolution in the time domain, the frequency domain, or both the time and frequency domain may offer better sensitivity for pulse detection.

According to one embodiment, an analog threshold 19 coupled to input 14 sends a threshold exceeded notification to processor 20 when the input signal exceeds a threshold value. Another notification may be sent to processor 40 when the input signal falls below the threshold value. In response, processor 20 may record sample identifiers for samples that exceed the threshold value. The threshold value may be set to be approximately equivalent to the dynamic range of guided wave Bragg cell 18 to detect signal samples that saturate Bragg cell 18. According to one example, guided wave Bragg cell 18 may have a lower dynamic range such as approximately 30 decibels while sample manager 16 may have a higher dynamic range of approximately 60 decibels.

Processor 20 instructs sample manager 16 to retrieve certain signal samples, and may comprise a small and low throughput digital signal processor. The retrieved samples may include samples that correspond to the time and frequency intervals of detected pulses, samples that exceed the threshold value, other signal samples, or any combination of the preceding. Processor 20 may then run a pulse detection procedure on the retrieved samples to detect any pulses that might be present in the samples. Accordingly, pulses may be detected in the portions of the signal in which the limited dynamic range of guided wave Bragg cell 18 would preclude accurate processing of those samples. If the number of samples that exceed the threshold is a small fraction of the total number of samples in the signal, processor 20 may handle the increased computational load presented by the implementation of the pulse detection procedure.

According to one embodiment, digital processor 20 may comprise a low throughput digital signal processor that monitors and controls the operation of the pulse detector and implements the pulse detection procedure on samples that exceed the threshold of analog threshold 19. Digital processor 20 need not be a pulse characterizer that comprises a digital processor used to implement the computationally intensive characterization algorithms. Digital processor 20, however, may be combined with the digital processor implementing the pulse characterizer.

In response to the instructions from processor 20, sample manager 16 retrieves the signal samples and sends them to other components for additional processing. For example, the samples may be sent to analog-to-digital converter 22, pulse characterizer 24, other component, or any combination of the preceding. Samples not requested by processor 20 may be dumped or discarded to clear the storage element for a new sample.

Analog-to-digital converter 22 converts the input signal from an analog form to a digital form. Selecting certain signal samples for digitizing may reduce the required rate of analog-to-digital converter 22. Samples that are not requested by the processor 20 are cleared from the analog sampler by either dumping the stored signal into the substrate or by some other suitable means. Disposing of these samples makes room to store new samples of the incoming signal and slows the output data rate of the sample storage component, which may reduce the required A/D converter rate. Pulse characterizer 24 may be used to estimate pulse characteristics such as duration, amplitude, modulation type, other characteristic, or any combination of the preceding. Typically, estimating the characteristics of a pulse is computationally intensive. Accordingly, selecting certain signal samples for pulse characterization may reduce computation.

Alterations or permutations such as modifications, additions, or omissions may be made to system 10 without departing from the scope of the invention. Moreover, the operations of system 10 may be performed by more, fewer, or other components. For example, the operations of analog threshold 19 and processor 20 may be performed by one component, or the operations of processor 20 may be performed by more than one component. Additionally, operations of system 10 may be performed using any suitable logic comprising software, hardware, other logic, or any suitable combination of the preceding. As used in this document, "each" refers to each member of a set or each member of a subset of a set.

FIG. 2 is a diagram illustrating one embodiment of a system 110 for coherent optical detection of a pulse in a signal. System 110 utilizes coherent optical detection to detect a pulse in a signal. To achieve coherent optical detection, a second and unmodulated laser beam that is coherent with the modulated beam, is directed onto the optical detectors. An unmodulated laser beam refers to a laser beam that is not modulated with signal information. The optical detectors detect the sum of the spatially modulated beam from the guided wave Bragg cell and the unmodulated beam. The net result is that a component of the current from each optical detector is present that is proportional to the amplitude, not the intensity, of the Fourier transform of the input signal.

According to the illustrated embodiment, system 110 includes a waveguide 112, an input 114, a sample manager 116, a guided wave Bragg cell 118, an analog threshold 119, and a processor 120 coupled as shown. System 110 is coupled to an analog-to-digital (A/D) converter 122 and a pulse characterizer 124 as shown. Waveguide 112, input 114, sample manager 116, analog threshold 119, processor 120, analog-to-digital converter 122, and pulse characterizer 124 may operate as described with reference to FIG. 2.

Guided wave Bragg cell 118 includes a transducer 146, an acoustic absorber 148, and medium 164. Diode laser 142 may or may not be located external to waveguide 112. If diode laser 142 is located external from waveguide 112, the beam from diode laser 142 may be injected into waveguide 112. Diode laser 142 directs a light beam towards guided wave Bragg cell 118. Diode laser 142 may comprise a Gallium Arsenide diode laser that is designed for sufficient coherence for coherent optical detection and that emits a beam with a wavelength that ranges from 0.75 to 0.88 microns. Laser 142, however, may comprise any laser that is sufficiently coherent for coherent detection and that has a wavelength compatible with the optical characteristics of the optical waveguide. For example, laser 142 may comprise a non-diode laser, such as a one milliwatt single mode helium neon (HeNe) laser at a 205 megahertz bandwidth and a 3.5 megahertz resolution. A single tone spur may have a free dynamic range of 50 decibels, while a two tone third order spur free may have a dynamic range of 40 decibels and a drive power of 50 milliwatts per signal.

Guided wave Bragg cell 118 splits the light beam into a modulated beam that is modulated by the input signal and an unmodulated light beam. Bragg grating lens 170 generates a local oscillator beam from the unmodulated beam, and may comprise a concave electro-optical Bragg grating lens. The Bragg constraints of Bragg grating lens 170 may be selected such that Bragg grating lens 170 reflects and increases the divergence of the unmodulated beam but does not affect the modulated beam.

Waveguide lens 172 focuses the modulated beam onto detector array 152. The unmodulated beam has a divergence greater than that of the modulated beam due to Bragg grating lens 170, and is spread uniformly over detector array 152. The unmodulated beam operates as a local oscillator beam for coherent optical detection at detector array 152. The local oscillator beam interferes with the modulated beam at detector array 152 to provide a conversion gain that yields an increased dynamic range. Detector array 152 generates a band-pass signal in response to the beam interference. Focal plane processor 154 may use a filter centered around the band-pass of the signal to reject noise outside of the band-pass of the signal. An envelope detector that follows the filter may be used to detect a pulse that may be present.

Alterations or permutations such as modifications, additions, or omissions may be made to system 110 without departing from the scope of the invention. Additionally, the operations of system 110 may be performed using any suitable logic comprising software, hardware, other logic, or any suitable combination of the preceding.

FIG. 3 is a diagram illustrating another embodiment of a system 210 for coherent detection of a pulse in a signal. System 210 includes a waveguide 212, an input 214, a sample manager 216, a guided wave Bragg cell 218, an analog threshold 219, and a processor 220 coupled as shown. System 210 is coupled to an analog-to-digital converter 222 and a pulse characterizer 224 as shown. Waveguide 212, input 214, sample manager 216, analog threshold 219, processor 220, analog-to-digital converter 222, and pulse characterizer 224 may operate as described with reference to FIG. 2.

Guided wave Bragg cell 218 includes a transducer 246, an acoustic absorber 248 and a medium 264. Additional components may include a Bragg grating lens 270, optics 274, a detector array 252, and a focal plane processor 254, and may operate as described with reference to FIG. 2. Diode laser 242, optics 274, detector array 252, and focal plane processor 254 may be located external to waveguide 212, and transducer 246, acoustic absorber 248, and Bragg grating lens 270 may be included in waveguide 212.

Optics 274 directs the unmodulated beam and the modulated light beam towards detector array 252 for coherent detection at detector array 252. Optics may includes lens 280. Cylindrical lenses 280a and 280c may image the beam exiting the waveguide in the vertical direction onto detector array 252. Lens 280b may focus the beam in the horizontal direction so that a component of the light falling on detector array 252 has a complex amplitude as a function of displacement that is the Fourier transform of the incoming signal.

Systems 110 and 210 may have a larger dynamic range than that of system 10 of FIG. 1. Dynamic range (DR) is defined as:

$$DR = 10\log(P_{max}/P_{min})$$

where $P_{max}$ is maximum power that a signal can have, and $P_{min}$ is the minimum power that a signal can have in order for a processor to give sufficiently accurate answers. For example, systems 110 and 210 may have a dynamic range that is approximately twice that of system 10.

Alterations or permutations such as modifications, additions, or omissions may be made to system 210 without departing from the scope of the invention. Additionally, the operations of system 210 may be performed using any suitable logic comprising software, hardware, other logic, or any suitable combination of the preceding. For example, an embodiment may use a guided wave Bragg cell as a spatial light modulator. Any suitable spatial light modulator, however, may be used. As an example, a spatial light modulator that can suitably spatially modulate a coherent beam of light with the desired signal and fit within the geometrical and optical constraints of the system may be used.

Certain embodiments of the invention may provide one or more technical advantages. A technical advantage of one embodiment may be that pulses may be detected and located using a guided wave Bragg cell. Detecting and locating pulses in this manner may allow for processing of extremely wide bandwidth signals that include multiple pulses per second, while making efficient use of size, weight, and power.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for detecting a pulse in a signal, comprising:
   a spatial light modulator operable to:
      receive a signal having a signal current;
      receive a light beam; and
      spatially modulate the light beam in response to the signal current, the signal current operable to drive the spatial light modulator to modulate the light beam, the modulated light beam having a complex amplitude proportional to the signal current;
   a lens operable to:
      receive the modulated light beam; and
      focus the modulated light beam, the focused modulated light beam having a complex amplitude proportional to a Fourier transform of the signal current;
   an optical detector array operable to:
      detect the focused modulated light beam; and
      generate a detector output in response to detecting the focused modulated light beam; and
   a processor operable to:
      detect the presence of a pulse in accordance with the detector output; and
      identify a portion of the signal comprising a pulse by:
         identifying a time interval of the portion comprising the pulse; and
         identifying a frequency interval of the portion comprising the pulse.

2. The system of claim 1, further comprising a sample manager operable to:
   sample the signal to yield a plurality of signal samples;
   store the samples;
   establish one or more signal samples of the plurality of signal samples, the one or more signal samples comprising the pulse; and
   send the one or more signal samples comprising the pulse to a pulse characterizer.

3. The system of claim 1, the processor further operable to:
   establish a signal sample of a plurality of signal samples corresponding to a signal portion where the signal current exceeds a threshold value; and
   request that the established signal sample be sent to a processor operable to detect a pulse in the established signal samples according to a pulse detection procedure.

4. The system of claim 1, further comprising a sample storage operable to dispose of one or more signal samples that are not requested by the processor.

5. The system of claim 1, wherein:
   the system further comprises a lens operable to split the light beam to yield the modulated light beam and an unmodulated light beam, the modulated light beam having the complex amplitude proportional to the Fourier transform of the signal current, the unmodulated light beam directed by an optical system to illuminate the optical detector array, the unmodulated light beam coherent with respect to the modulated light beam; and
   the optical detector array is further operable to detect the modulated light beam by detecting interference of the modulated light beam and the unmodulated light beam.

6. The system of claim 1, wherein the optical detector array is operable to:
   receive the modulated light beam; and
   detect the focused modulated light beam by direct detection.

7. The system of claim 1, further comprising:
   a sample manager operable to sample the signal at a sample rate to yield a plurality of signal samples; and
   a sample storage operable to:
      store the signal samples; and
      output the signal samples at an output rate to an analog-to-digital converter, the output rate less than or equal to the sample rate.

8. A method for detecting a pulse in a signal, comprising:
   receiving a signal having a signal current;
   receiving a light beam;
   driving a spatial light modulator in response to the signal current to spatially modulate the light beam, the modulated light beam having a complex amplitude proportional to the signal current;
   focusing the modulated light beam, the focused modulated light beam having a complex amplitude proportional to a Fourier transform of the signal current;
   detecting the focused modulated light beam at a detector array;
   generating, a detector output in response to detecting the focused modulated light beam;
   detecting the presence of a pulse in accordance with the detector output; and
   identifying a portion of the signal comprising a pulse by:
      identifying a time interval of the portion comprising the pulse; and
      identifying a frequency interval of the portion comprising the pulse.

9. The method of claim 8, further comprising:
   sampling the signal to yield a plurality of signal samples;
   storing the samples;
   establishing one or more signal samples of the plurality of signal samples, the one or more signal samples comprising the pulse; and
   sending the one or more signal samples comprising the pulse to a pulse characterizer.

10. The method of claim 8, further comprising:
    establishing a signal sample of a plurality of signal samples corresponding to a signal portion where the signal current exceeds a threshold value; and
    sending the established signal sample to a processor operable to detect a pulse in the established signal sample according to a pulse detection procedure.

11. The method of claim 8, further comprising disposing of one or more signal samples that are not requested by a processor.

12. The method of claim 8, wherein:
driving the spatial light modulator further comprises splitting the light beam to yield the modulated light beam and an unmodulated light beam; and
detecting the modulated light beam further comprises detecting a light beam comprising the interference of the modulated light beam and the unmodulated light beam, the light beam having a complex amplitude having a component proportional to the Fourier transform of the signal current.

13. The method of claim 8, wherein detecting the modulated light beam further comprises directly detecting the modulated light beam.

14. The method of claim 8, further comprising:
sampling the signal at a sample rate to yield a plurality of signal samples;
storing the signal samples; and
outputting the signal samples at an output rate to an analog-to-digital converter, the output rate less than or equal to the sample rate.

15. A system for detecting a pulse in a signal, comprising:
a waveguide comprising a substrate region and a diffused region, the diffused region operable to:
receive a signal having a signal current; and
receive a light beam; and
a spatial light modulator, the signal operable to drive the spatial light modulator to spatially modulate the light beam, the modulated light beam having a complex amplitude proportional to the signal current;
a lens operable to:
receive the modulated light beam; and
focus the modulated light beam, the focused modulated light beam having a complex amplitude proportional to a Fourier transform of the signal current;
a detector array operable to:
detect the focused modulated light beam; and
generate a detector output in response to detecting the focused modulated light beam;
a processor operable to:
detect the presence of a pulse in accordance with the detector output; and
identify a portion of the signal comprising a pulse; and
a sample manager operable to:
sample the signal at a sample rate to yield a plurality of signal samples;
establish one or more signal samples of the plurality of signal samples corresponding to the pulse;
send the one or more signal samples to a pulse characterizer;
dispose of samples not required to locate the pulse; and
output the samples at an output rate, the output rate less than or equal to the sample rate.

16. A system for detecting a pulse of a signal, comprising:
means for receiving a signal having a signal current;
means for receiving a light beam;
means for driving a spatial light modulator in response to the signal current to spatially modulate the light beam, the modulated light beam having a complex amplitude proportional to the signal current;
means for focusing the modulated light beam, the focused modulated light beam having a complex amplitude proportional to a Fourier transform of the signal current;
means for detecting the focused modulated light beam at a detector array;
means for generating a detector output in response to detecting the focused modulated light beam;
means for detecting the presence of a pulse in accordance with the detector output; and
means for identifying a portion of the signal comprising a pulse by:
identifying a time interval of the portion comprising the pulse; and
identifying a frequency interval of the portion comprising the pulse.

17. A system for detecting a pulse in a signal, comprising:
a spatial light modulator operable to:
receive a signal having a signal current;
receive a light beam; and
spatially modulate the light beam in response to the signal current, the signal current operable to drive the spatial light modulator to modulate the light beam, the modulated light beam having a complex amplitude proportional to the signal current;
a lens operable to:
receive the modulated light beam; and
focus the modulated light beam, the focused modulated light beam having a complex amplitude proportional to a Fourier transform of the signal current;
an optical detector array operable to:
detect the focused modulated light beam; and
generate a detector output in response to detecting the focused modulated light beam;
a processor operable to:
detect the presence of a pulse in accordance with the detector output; and
identify a portion of the signal comprising a pulse by:
identifying a time interval of the portion comprising the pulse; and
identifying a frequency interval of the portion comprising the pulse;
a sample manager operable to:
sample the signal at a sample rate to yield a plurality of signal samples;
establish one or more signal samples of the plurality of signal samples corresponding to the pulse; and
send the one or more signal samples to a pulse characterizer, the processor further operable to:
establish a signal sample of the plurality of signal samples corresponding to a signal portion where the signal current exceeds a threshold value; and
request that the established signal sample be sent to a pulse characterizer operable to detect a pulse in the established signal sample according to a pulse detection procedure; and
a sample storage operable to:
dispose of a signal sample that is not requested by the processor; and
output the samples at an output rate, the output rate less than or equal to the sample rate, the spatial light modulator further operable to split the light beam to yield the modulated light beam and an unmodulated light beam, the modulated light beam having the complex amplitude proportional to the Fourier transform of the signal current, the unmodulated light beam directed by an optical system to illuminate the detector array, the detector array further operable to detect the modulated light beam by performing at least one of the following:
detecting interference of the modulated light beam and the unmodulated light beam; and
detecting by direct detection the focused modulated light beam.

* * * * *

UNITED STATES PATENT AND TRADEMARK OFFICE
CERTIFICATE OF CORRECTION

PATENT NO. : 7,421,212 B2 Page 1 of 1
APPLICATION NO. : 10/994589
DATED : September 2, 2008
INVENTOR(S) : John B. Allen It is certified that error appears in the above-identified patent and that said Letters Patent is hereby corrected as shown below:

<u>Column 3, Line 58:</u>
After "signal that includes a pulse, not" delete "15".

Signed and Sealed this

Thirteenth Day of January, 2009

JON W. DUDAS
*Director of the United States Patent and Trademark Office*